(12) United States Patent
Droege et al.

(10) Patent No.: US 7,039,617 B1
(45) Date of Patent: May 2, 2006

(54) CURRENCY AND FLOAT ID TRACKING IN AN ELECTRONIC PURSE

(75) Inventors: Hartmut Droege, Stuttgart (DE); Martin Witzel, Schoenaich (DE)

(73) Assignee: International Business Machines Corporation, Armonk, NY (US)

(*) Notice: Subject to any disclaimer, the term of this patent is extended or adjusted under 35 U.S.C. 154(b) by 837 days.

(21) Appl. No.: 09/709,064

(22) Filed: Nov. 9, 2000

(30) Foreign Application Priority Data

Nov. 12, 1999 (EP) .................................. 99122520

(51) Int. Cl.
*G06F 17/60* (2006.01)

(52) U.S. Cl. ........................... 705/67; 705/50; 705/51; 705/64; 705/65; 705/66; 705/71; 705/72; 705/75; 705/76; 713/150; 713/182; 380/277; 380/278; 380/279; 380/44; 380/200; 235/380; 726/2; 726/3; 726/4; 726/5; 726/6; 726/7; 726/27; 726/29; 726/30

(58) Field of Classification Search ............ 705/50–79, 705/41; 235/379, 380, 382; 713/172, 185, 713/150, 182, 200–202, 163; 380/277–285, 380/44, 200; 726/2–7, 27, 28–30
See application file for complete search history.

(56) References Cited

U.S. PATENT DOCUMENTS

| | | | | |
|---|---|---|---|---|
| 5,231,666 A | * | 7/1993 | Matyas ........................ | 705/75 |
| 5,309,516 A | * | 5/1994 | Takaragi et al. ............. | 380/45 |
| 5,621,201 A | | 4/1997 | Langhans et al. ........... | 235/380 |
| 5,987,438 A | * | 11/1999 | Nakano et al. ............... | 705/41 |
| 6,055,314 A | * | 4/2000 | Spies et al. .................. | 380/228 |
| 6,282,522 B1 | * | 8/2001 | Davis et al. .................. | 705/41 |
| 6,386,446 B1 | * | 5/2002 | Himmel et al. ............. | 235/380 |
| 6,418,420 B1 | * | 7/2002 | DiGiorgio et al. ........... | 705/40 |
| 6,427,140 B1 | * | 7/2002 | Ginter et al. ................. | 705/80 |
| 6,915,434 B1 | * | 7/2005 | Kuroda et al. ............... | 713/193 |
| 2004/0031856 A1 | * | 2/2004 | Atsmon et al. ............. | 235/492 |

FOREIGN PATENT DOCUMENTS

| | | |
|---|---|---|
| DE | 197 18 115 A 1 | 6/1998 |
| EP | 0 798 672 A2 | 10/1997 |
| EP | 0 818 761 A1 | 1/1998 |
| WO | WO 92/13316 * | 8/1992 |
| WO | WO 96/27155 | 9/1996 |

OTHER PUBLICATIONS

"Europay: Common Electronic Purse Specifications Released", Apr. 1, 1999, M2Presswire.*
USPTO translation of WO92/13316, May 16, 2005.*
Article entitled "Cashless Society or Digital Cash?" by Reynolds Griffith, Southwestern Society of Economists, Mar. 1994, 6 pages, found at http://www.sfasu.edu/finance/FINCASH.HTM.

* cited by examiner

*Primary Examiner*—James P. Thammell
*Assistant Examiner*—Jalatee Worjloh
(74) *Attorney, Agent, or Firm*—William A. Kinnaman, Jr.

(57) ABSTRACT

The present invention relates to electronic purse systems, and in particular it relates to the improved management of multiple money flows in such systems. According to the basic principles of the present invention it is proposed that the secure access modules (SAMs) of a purse provider support multiple user groups or environments in the system while still requiring only one system key. The user groups or environments are identified by a so-called float ID tag which is advantageously added to each set of data involved in a load or purchase process performed by the user of the electronic purse system.

19 Claims, 2 Drawing Sheets

CURRENCY AND FLOAT ID TRACKING IN AN ELECTRONIC PURSE

BACKGROUND OF THE INVENTION

1. Field of the Invention

The invention relates to electronic purse systems, and in particular it relates to the improved management of multiple money flows in such systems.

2. Description of the Related Art

Electronic purse systems exist in multiple implementations and are usually targeted at one particular group of customers.

An example is the electronic purse system operated by the German Zentraler Kreditausschuss (ZKA) which handles the management of eurocheque cards, so-called ec-cards, issued for actuating electronic money transfers intended by the owners of ec-cards, the respective card holders in Germany.

The implementations which are known can, however, usually accommodate only one currency at a time, or they can only accept payments from one user group and do not have the capability to differentiate between more than one user group when using only one system key. Examples for such a desired differentiation are, however, patrons as service buyers at a company cafeteria which is open to employees of the company but also to contractors, to employees of a neighbor establishment, visitors from other companies, or other eligible groups.

It is important that, when the card holder comes to a service provider and makes a purchase, the service provider is reimbursed for his services from the money which the card holder has paid when he had loaded his electronic purse. The path this money takes through the system is a money flow.

Purses known so far do not have the feature to support more than one money flow with one system key only. They are understood to work with one currency and for one user group only.

For terminology purposes, "purse" described here is understood to be a money management component which is configured to work with one currency at a time. The surrounding system however can accept a multitude of such "purses" configured to different currencies.

If card holders can load their purses in one place and spend it in another place, or if there are different card holder groups, then the necessity can arise that these money flows shall be kept separate. The purse provider is the hub who receives load transaction records and money from the load stations, keeps these money flows in a multitude of accounts, and distributes the money from these accounts to service providers upon receipt of a purchase transaction record. If there is more than one environment—where the term "environment" should be understood for the purposes of the present invention as a synonym for user group—in which cards can be loaded, and/or more than one environment in which the money can be spent for purchases, then the purse provider has to keep as many accounts as there are environments or user groups, respectively. Each such an account in prior art technique is associated with the task of maintaining a system key.

Money flows into an account or out from an account must be traceable to the respective environment in which the load and purchase transactions have taken place. The purse system provider therefore has a business interest to keep these money flows separate and track them separately mainly because of billing purposes associated with the concerned service provider(s).

The service providers themselves may also want to differentiate between different groups of buyers simply for identification purposes. Different prices based on a certain subsidy for the employees which is not granted to foreign persons may for instance be a reason to identify user groups separately. Other reasons exist dependent of the respective field of application.

User group separation can also be accomplished—and has been in the past—with different system keys for each group. Such a differentiation by keys introduces a prohibitively involved key management, including a corresponding number of secure access modules (SAMs), which are installed in each load and pay stations in order to perform a secure processing of any load and purchase transaction and which thus have to be present in any load stations and purchase stations contained in the system.

The handling of more than one system key, however, is difficult as each system key has to be kept strictly secret and must be hidden from service persons occupied with servicing the transaction processes and the services necessary to operate the plurality of SAMs. In any case, the generation and the distribution of such a system key has to be kept secure. Thus, even checking if a system key stored in a SAM is correct is a task which is difficult to perform, as it is not readable there out of reasons of security. The more different system keys a purse system uses, the lesser comfortable is its management.

SUMMARY OF THE INVENTION

It is thus an object of the present invention to provide a method in an electronic purse system which is adapted to manage a plurality of user groups without maintaining a respective plurality of system keys each associated with a respective user group in prior art.

The method and system as claimed in the independent claims solve this problem. Advantageous embodiments thereof reveal from respective subclaims.

According to the basic principles of the present invention it is proposed that the secure access modules (SAMs) of a purse provider need to hold only one system key and that user groups or environments which can be supported by the system are identified by a so-called float ID tag which is advantageously added to each set of data involved in a load or purchase process performed by the user of the electronic purse system.

As a matter of fact, this float ID tag introduces new features characterizing the user group into each set of data associated with a load or a purchase process. Such a new feature does not need to be treated as strictly secret as it is necessary with the system key. It may still need to be adequately protected against fraudulent modifications. This way, an adequate means for managing more than one user group or environments is found which does not imply any involvement of the protected system key.

As an advantage of this basic approach of the present invention, purses which have been loaded in a given environment can be used to purchase goods at an environment located elsewhere, as for example it is the case when the purse provider operates a system at company A and another system at company B.

Then, a card which has been loaded with "electronic money" at company A (environment A) can be used to buy services at company B (environment B). The money flows are continually traceable, from the moment the purse is loaded at place A, up to the moment when a purchase is made at another establishment in B, until the service provider in place B receives money from the account A which belongs to the load station in environment A.

By aid of said tag field identifying the specific environment or the user group each money flow can easily traced through the system. The system has become essentially more flexible compared to prior art while having just one system key.

According to a second aspect of the present invention a second tag field can be added as described above: a currency indicating tag.

The system according to this additional feature of the present invention has the advantage that it accommodates multitude of purses with different currencies, for instance purses for German marks or purses for euros, or purses for US dollars, etc.

In addition, it accepts a multitude of combinations of a currency and a user group, for instance a purse from an own employee in German marks, a purse from a contractor in euros, a purse with US dollars from a neighbor company, francs from a visitor, etc. The SAMs always contain the same set of keys since they belong to one purse provider but they still accommodate a multitude of currencies and environments/user groups.

In this case each electronic purse is tagged with a parameter pair which indicates the currency and the user group to which the owner belongs. These tags can be changed under control of the purse provider if the purse provider decides to allow this feature, for instance to allow a switch of the currency for a purse.

BRIEF DESCRIPTION OF THE DRAWINGS

An embodiment of the method of the present invention will be exemplarily described in more detail in conjunction with the drawings in which.

DESCRIPTION OF THE PREFERRED EMBODIMENT

Figure 1:
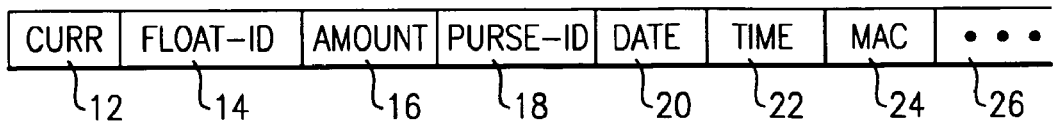
FIG. 1 is a schematic sketch of a data set generated in both of the above cases of loading and purchasing.

With general reference to the figures and with special reference to FIG. 1 the basic structure of a data set 10 generated during a preferred embodiment of the method of the present invention will be described as follows.

The electronic purse system is installed in a cafeteria which can be visited by the staff of two companies A and B concurrently, as well as by visitors to the companies. Staff members and visitors each have a chip card for use in this electronic purse system. The system requires only one system key which is valid for all three different user groups.

The first field contained in the data set is the currency field 12. In here an ID is stored which is unique for each of the currencies supported by the electronic purse system according to the present invention.

The next field is the field 14 containing the float ID. In the exemplary embodiment three different float IDs are required for identifying each of the three accepted user groups mentioned above.

In the next field 16 the load or purchase amount in a transaction is stored. Among other fields, a balance field is optional.

Field 18 depicts the purse ID. By that field an individual purse is identified by the system. It can be used for error recovery.

Fields 20, 22 contain date and time associated with different processes as purchases or load processes effectuated by a user.

In the portion depicted by 24 other fields are provided which need not to be mentioned for sake of clarity.

Next, and with additional reference to FIG. 2 a typical card loading process in the purse system of the present invention will be described in more detail.

A user, assumed as a staff member of company A wants to load his card. To do this, he puts it into the slot of a card loading terminal installed in a building of company A, step 110.

First, in analogy to prior art authentication methods, the secure access module (SAM) and the purse verify the correctness of the system key. One component calculates a message authentication code (MAC) using the system key, step 120. The other component verifies the MAC and therewith data correctness and key equality, step 130. If the purse key does not match the one in the SAM, which might be the case when the user puts in some different card, the card is rejected from further processing, step 140.

Otherwise, the SAM reads the float ID in order to know about the user group the user is associated with, step 150. The float ID is checked whether it is supported in the SAM what yields a decision, step 160. If the float ID is not maintained in the purse system, maybe because the user is staff member of a company C having the same purse system with the same system key but without a permission to use the load terminal, the card is restricted from further processing as well, step 140.

Otherwise, step 170, the SAM reads the currency indicator from the purse e.g., euros, US dollars, or German marks.

The SAM checks if the indicated currency of the purse is supported in the SAM and rejects the purse if this is not the case, steps 180, 140. A purse card can only be loaded with the currency which is indicated in its currency field.

Then, the flow of events where the purse is loaded is analogous to prior art, step 190.

Then, in a step 200 the program residing in the SAM generates a transaction data set as depicted in FIG. 1. In particular, the fields containing the float ID, currency and the transaction amount as well as the purse ID are stored in the data set. Optionally accumulated data sets which include the float ID, currency, and the accumulated transaction amounts of more than one transaction can be used to account for the total money turnover at a service station. This saves communication overhead.

Then, in a step 210 the data set is sent to the purse provider.

Further, in step 220 the purse balance is updated, where the load amount is added to the amount which was present on the card before loading it. Then, the loading procedure has completed and the card is ejected to the user, step 230.

According to the present invention, the flow of the cash can now be traced throughout the purse system with the help of the data records as mentioned above. The users can be treated separately according to their respective user group.

Figure 3:
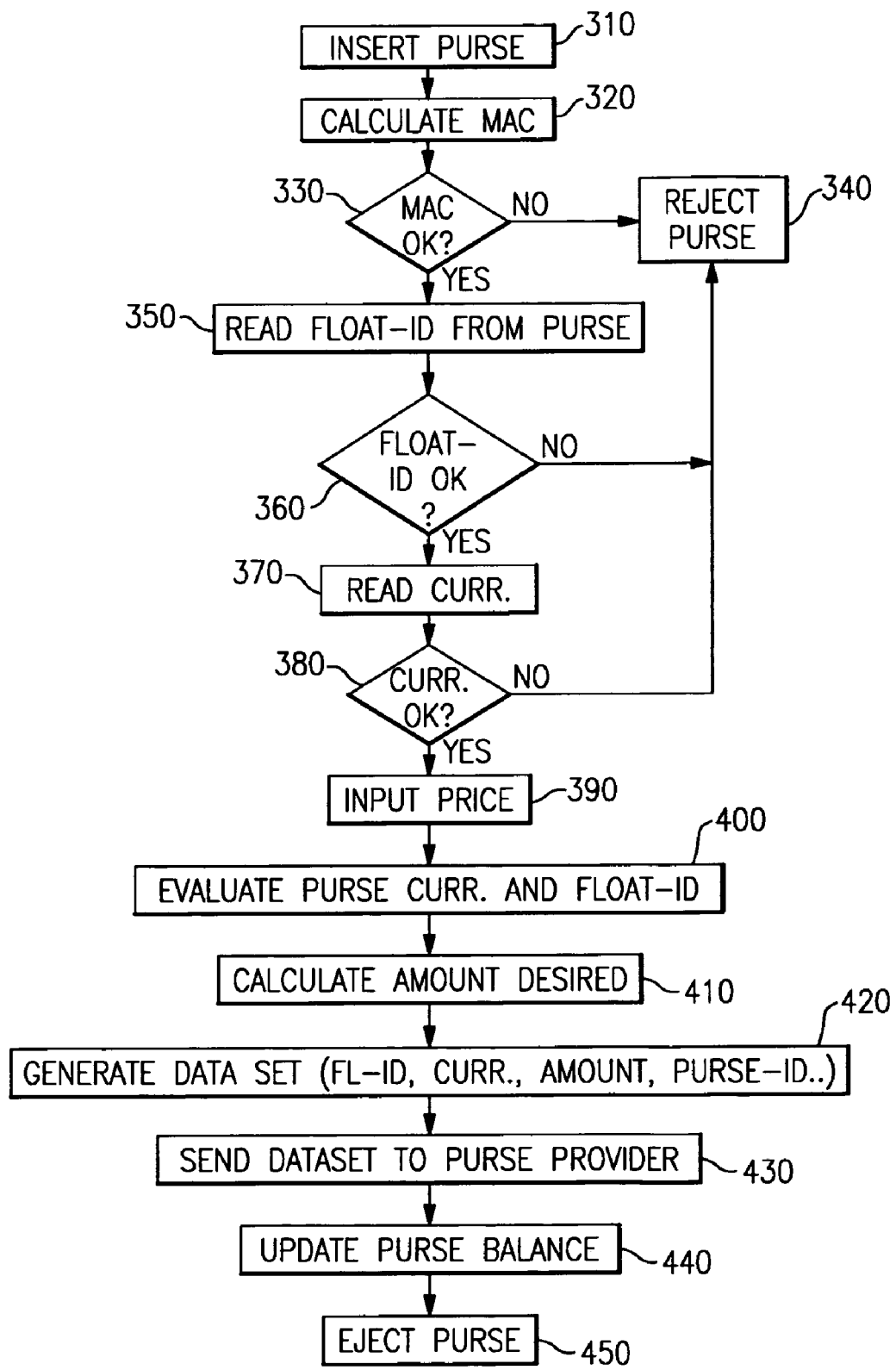
FIG. 3 is a schematic block diagram showing the control flow during a process according to the method of the present invention in which a purchase is undertaken with said card described in FIG. 2.

With reference to FIG. 3 a typical purchase is described in more detail which is effectuated by the same user in the cafeteria using a respective purchase terminal of the electronic purse system.

The user chooses some coffee and some cake for three colleagues and himself. For paying it he inserts his card into the card reader present at the purchase terminal, step 310.

Figure 2:
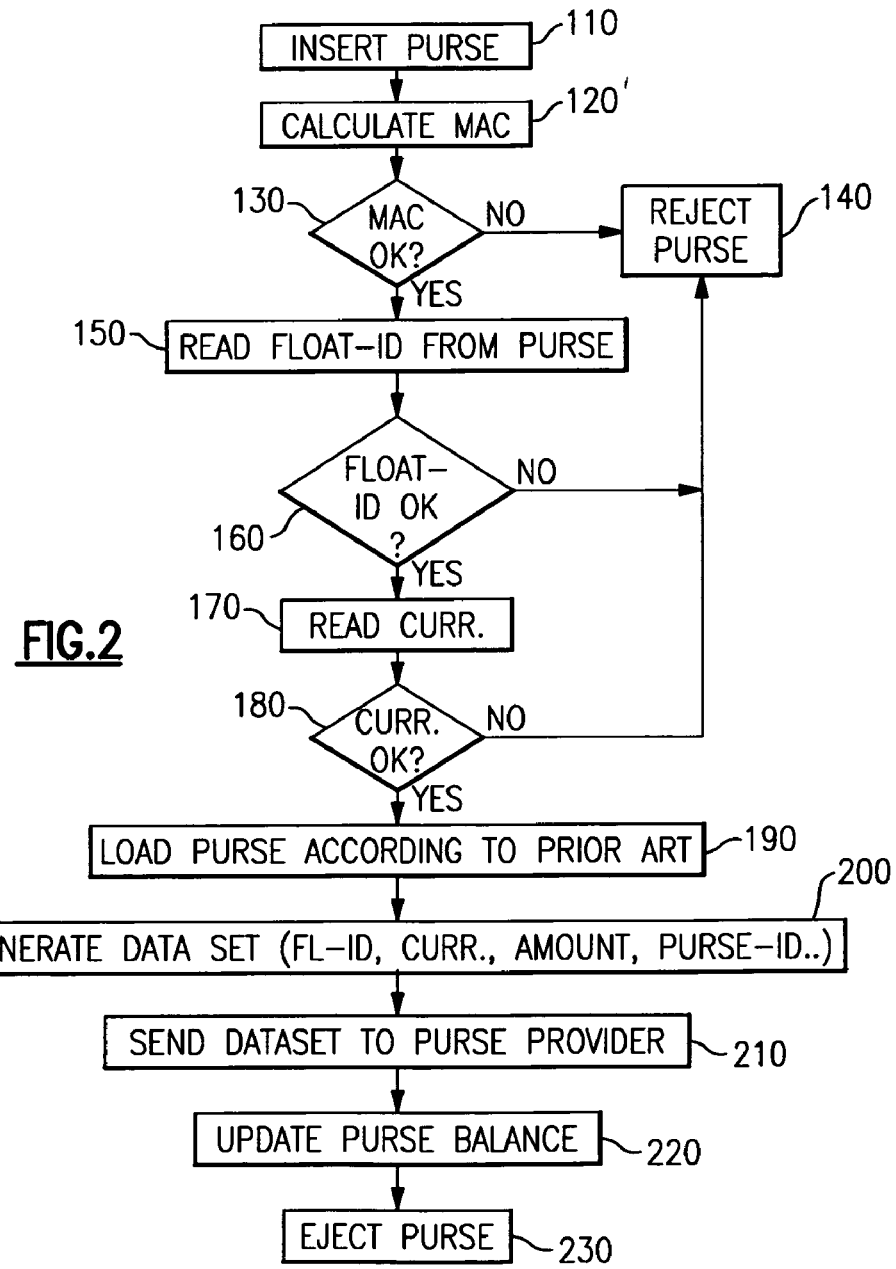
FIG. 2 is a schematic block diagram showing the control flow during a process according to the method of the present invention in which a card used in the system is loaded.

Then, preferably, steps 310 to 380 are performed in the same way as described in steps 120 to 180 with reference to FIG. 2. A detailed description for this sequence of steps can thus be omitted.

Then, in the YES-branch of step 380 the regular price for the purchase is input by the staff of the cafeteria and is read by the system from a respective input buffer, step 390.

Then, in a step 400, the purse currency and float ID and thus the user group associated with the purse holder from company A is evaluated by the system. It is assumed now that for staff from company A a price reduction of 20% relative to the regular prices is granted as respective subsidies from company A are given to its staff members. A purse with an unsupported currency or float ID is rejected.

Thus, in step 410, the reduced price is calculated as 80% of the regular price.

Then, steps 420 to 450 are performed as described in steps 200 to 230 of FIG. 2. In particular, the data set generated contains again the purse's float ID and currency.

Thus, the purchase procedure has completed and the data set containing the float ID enables the purse provider to trace the cash flow separated in respective user groups.

In addition, when staff of company B is granted only a price reduction of 10%, the reduced price is easily calculated as the reduction is coupled to the float ID and thus to the user group of company B. For a visitor the price reduction would be 0%, i.e., the regular price would have to be paid.

It is obvious that the general concept comprised of the present invention can be subjected to form various modifications not described explicitly in the foregoing description. In particular, a purse provider can provide a complex purse system having in total a plurality of system keys, the SAMs being spread over a large geographic zone and having locally concentrated purses with a single system key and multiple float IDs as described before.

Further, the aspects of the present invention can be combined as suited and required by the actual requirements. For example, the same float ID could be used in different purses with different system keys.

The present invention can be realized in hardware, software, or a combination of hardware and software. A typical combination of hardware and software could be a terminal with a SAM or any other software running on the SAM in more or less close interaction with a piece of software implemented in the user's card or associated to it, that, when being executed, controls the SAM or a program stored on the card such that it carries out the methods described herein. The present invention can also be embedded in a computer program product, which comprises all the features enabling the implementation of the methods described in order to carry out the method of the present invention in whole or in part. Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for operating an electronic purse system to provide personal access to one or more access stations in said system, each of said access stations containing a secure access module and being arranged to load or debit a purse card with an amount of money, said system having a system key for protecting transactions and for verifying that a secure access module and a purse card belong to the same system, said method being performed by one of said secure access modules and comprising the steps of:

defining a float ID for each of a plurality of user groups that are supported by said system;

defining a single system key that is shared by said plurality of user groups; and upon presentation of a purse card to an access station containing said secure access module:

determining whether a key on said purse card matches said single system key;

determining whether a float ID read from said purse card specifies a user group supported by said system; and completing a transaction with said purse card only if the key on the purse card matches said single system key and the float ID read from the purse card specifies a user group supported by said system.

2. The method of claim 1 in which the float ID is used to separately track the money flows associated with said float ID throughout said purse system, from the purse card up to a purse provider's accounting system.

3. The method of claim 1 in which said step of completing a transaction comprises the step of:

generating a data set containing the float ID read from said purse card.

4. The method of claim 3 in which said step of completing a transaction further comprises the step of:

transmitting said data set to a purse provider.

5. The method of claim 1, further comprising the step of:

defining a currency indicator for each of a plurality of a plurality of currencies that are supported by the system, said transaction being completed only if the float ID and a currency indicator read from said purse card specify a user group and currency supported by the system.

6. The method of claim 1 in which said transaction is a debit transaction, said step of completing a transaction comprising the step of:

debiting said purse card by an amount determined by the float ID read from said card.

7. The method of claim 1 in which the step of determining whether a key on said purse card matches said single system key comprises the step of:

verifying a message authentication code calculated using said single system key.

8. Apparatus for operating an electronic purse system to provide personal access to one or more access stations in said system, each of said access stations containing a secure access module and being arranged to load or debit a purse card with an amount of money, said system having a system key for protecting transactions and for verifying that a secure access module and a purse card belong to the same system, said apparatus being associated with one of said secure access modules and comprising:

means for defining a float ID for each of a plurality of a plurality of user groups that are supported by said system;

means for defining a single system key that is shared by said plurality of user groups; and means responsive to presentation of a purse card to an access station containing said secure access module for determining whether a key on said purse card matches said single system key;

means for determining whether a float ID read from said purse card specifies a user group supported by said system; and means for completing a transaction with said purse card only if the key on the purse card matches said single system key and the float ID read from the purse card specifies a user group supported by said system.

9. The apparatus of claim 8 in which said means for completing a transaction comprises:

means for generating a data set containing the float ID read from said purse card.

10. The apparatus of claim 9 in which said means for completing a transaction further comprises:

means for transmitting said data set to a purse provider.

11. The apparatus of claim 8, further comprising:

means for defining a currency indicator for each of a plurality of a plurality of currencies that are supported by the system, said transaction being completed only if the float ID and a currency indicator read from said purse card specify a user group and currency supported by the system.

12. The apparatus of claim 8 in which said transaction is a debit transaction, said means for completing a transaction comprising:

means for debiting said purse card by an amount determined by the float ID read from said card.

13. The apparatus of claim 8 in which the means for determining whether a key on said purse card matches said single system key comprises:

means for verifying a message authentication code calculated using said single system key.

14. A computer-readable medium tangibly embodying a computer program comprising code portions adapted to perform method steps for operating an electronic purse system to provide personal access to one or more access stations in said system when said program is loaded into a secure access module, each of said access stations containing a secure access module and being arranged to load or debit a purse card with an amount of money, said system having a system key for protecting transactions and for verifying that a secure access module and a purse card belong to the same system, said method steps comprising:

defining a float ID for each of a plurality of a plurality of user groups that are supported by said system;

defining a single system key that is shared by said plurality of user groups; and upon presentation of a purse card to an access station containing said secure access module:

determining whether a key on said purse card matches said single system key;

determining whether a float ID read from said purse card specifies a user group supported by said system; and completing a transaction with said purse card only if the key on the purse card matches said single system key and the float ID read from the purse card specifies a user group supported by said system.

15. The computer-readable medium of claim 14 in which said step of completing a transaction comprises the step of:

generating a data set containing the float ID read from said purse card.

16. The computer-readable medium of claim 15 in which said step of completing a transaction further comprises the step of:

transmitting said data set to a purse provider.

17. The computer-readable medium of claim 14, further comprising the step of:

defining a currency indicator for each of a plurality of a plurality of currencies that are supported by the system, said transaction being completed only if the float ID and a currency indicator read from said purse card specify a user group and currency supported by the system.

18. The computer-readable medium of claim 14 in which said transaction is a debit transaction, said step of completing a transaction comprising the step of:

debiting said purse card by an amount determined by the float ID read from said card.

19. The computer-readable medium of claim 14 in which the step of determining whether a key on said purse card matches said singe system key comprises the step of:

verifying a message authentication code calculated using said system key.

* * * * *

Disclaimer

Patent No. 7,039,617 - Hartmut Droege; Stuttgart, DE; Martin Witzel Schoenaich, DE. CURRENCY AND FLOAT ID TRACKING IN AN ELECTRONIC PURSE. Patent dated May 02, 2006. Disclaimer filed Oct. 04, 2006, by the assignee, INTERNATIONAL BUSINESS MACHINES CORPORATION.

Hereby enters this disclaimer to all claims and the entire term of said patent.

(*Official Gazette September 23, 2008*)